Feb. 25, 1964  K. GEBELE ET AL  3,122,083
PHOTOGRAPHIC CAMERA
Filed May 2, 1960  5 Sheets-Sheet 1

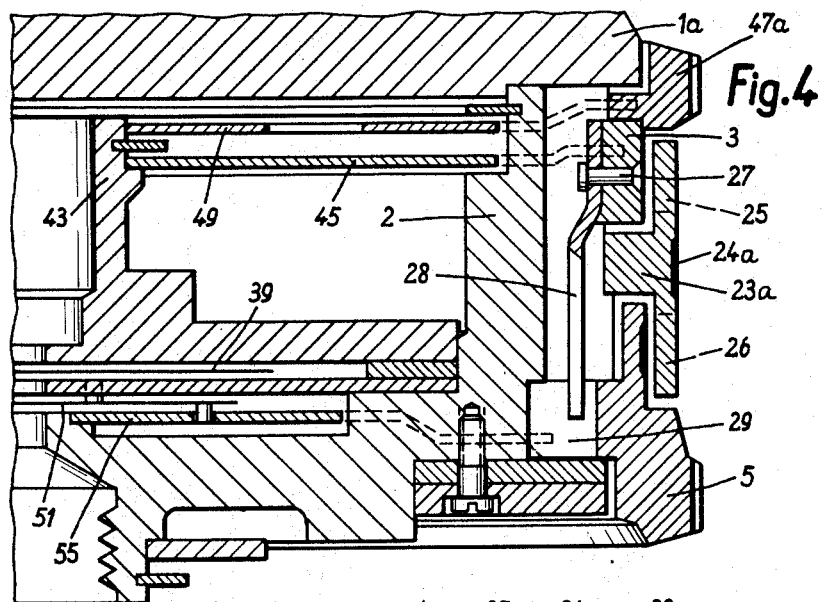
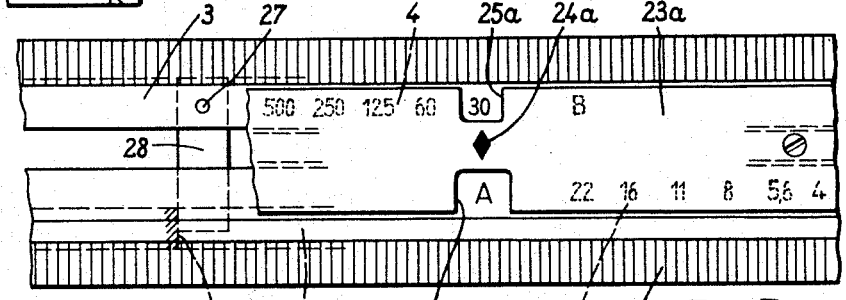
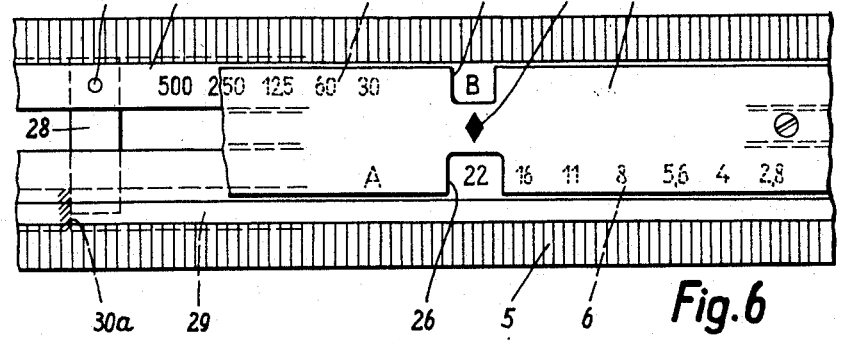

Feb. 25, 1964   K. GEBELE ET AL   3,122,083
PHOTOGRAPHIC CAMERA

Filed May 2, 1960   5 Sheets-Sheet 4

United States Patent Office 3,122,083
Patented Feb. 25, 1964

3,122,083
PHOTOGRAPHIC CAMERA
Kurt Gebele and Franz Singer, Munich, Germany, assignors to Compur-Werk Gesellschaft mit beschränkter Haftung & Co., Munich, Germany, a firm of Germany
Filed May 2, 1960, Ser. No. 26,168
Claims priority, application Germany May 6, 1959
9 Claims. (Cl. 95—64)

This invention relates to a photographic camera, and more particularly to a camera having means for what is called automatic or semi-automatic setting of at least one factor of the exposure value.

In certain types of such cameras, there are two rotatable rings, usually coaxial with each other. One of these is sometimes called the diaphragm switching ring, and is manually settable to one position for conditioning or controlling the internal mechanism in such a way that the diaphragm aperture will be set automatically in accordance with indications of a light meter or exposure value meter, and it may be set manually to any one of a plurality of other positions for selecting a predetermined diaphragm aperture independently of the light meter. The other ring may be called a shutter speed setting ring or switching ring, and is manually settable to various positions for controlling various different exposure speeds (durations of exposure) which are timed by the internal mechanism of the shutter, and to another position for a "B" or "bulb" exposure the duration of which is controlled manually rather than by the internal mechanism of the shutter. In the type of semi-automatic camera with which the present invention is primarily concerned, the diaphragm aperture can be set automatically provided the shutter speed control member has been preset to a position for an internally timed exposure appropriate for automatic setting of the diaphragm. However, when the shutter speed control member is set for a manually timed "B" or "bulb" exposure, then the diaphragm aperture cannot be set automatically and faulty operation will result if the diaphragm aperture switching ring is left in the position for automatic setting.

An object of the invention is to prevent such faulty operation.

Another object is to provide mechanism to insure that whenever the shutter speed setting member is set to a position which is not appropriate for automatic setting of the diaphragm aperture, the diaphragm aperture setting or switching ring must be moved to a position for determining the diaphragm aperture manually rather than automatically.

Still another object is the provision of interlocking mechanism so designed and constructed that the diaphragm aperture control member or switching member cannot be set to its "automatic" diaphragm setting position so long as the shutter speed control member is in its "B" or "bulb" position, and vice versa.

A further object is the provision of simple, sturdy, and inexpensive mechanism so designed that if it is attempted to shift the diaphragm aperture control member from a manual diaphragm aperture position to an automatic diaphragm aperture position while the shutter speed control member is in its "B" position, the motion of the diaphragm aperture control member to its automatic position will automatically shift the shutter speed control member from its "B" position to one of the internally timed shutter speed positions.

A still further object is the provision of a generally improved and more satisfactory shutter and diaphragm unit of the automatic or semi-automatic type.

These and other desirable objects may be attained in the manner disclosed as an illustrative embodiment of the invention in the following description and in the accompanying drawings forming a part hereof, in which.

Figure 1:
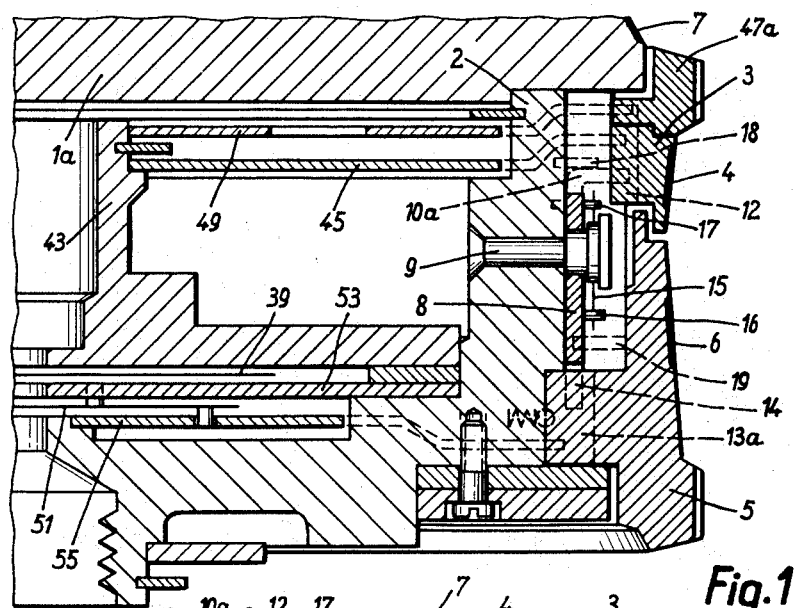
FIG. 1 is a fragmentary radial section through a portion of a shutter and diaphragm unit in a form in which the "B" or "bulb" reference mark on the shutter speed control member and the "A" or "automatic" reference mark on the diaphragm aperture control member are situated at corresponding ends of their respective speed and aperture scales.
Figure 2:
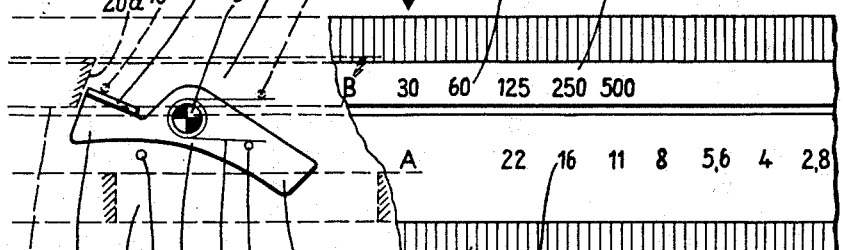
FIG. 2 is a schematic side elevation of the parts shown in FIG. 1, with the camera set for automatic operation.
Figure 3:
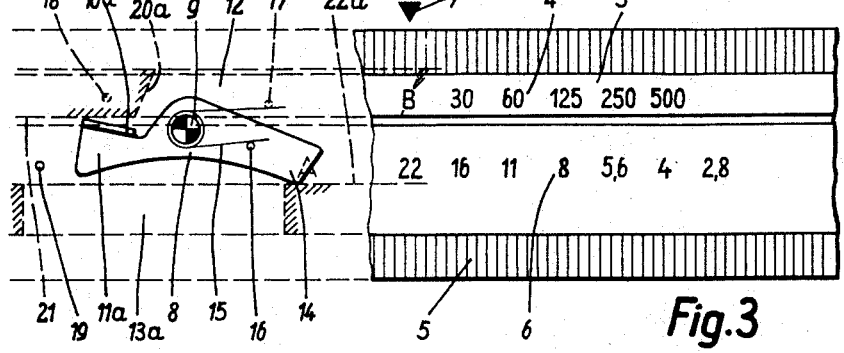
FIG. 3 is a view similar to FIG. 2, with the parts set for a "B" exposure and non-automatic operation of the diaphragm.
Figure 7:
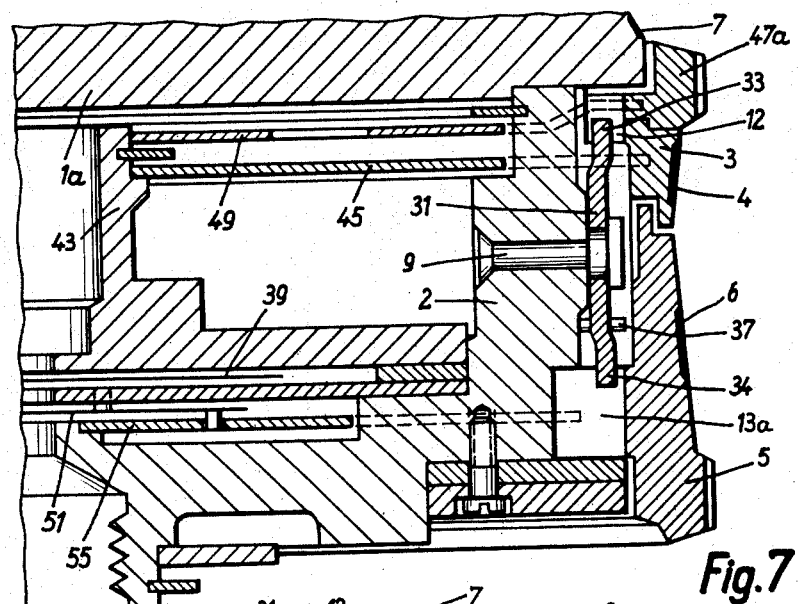
Figure 8:
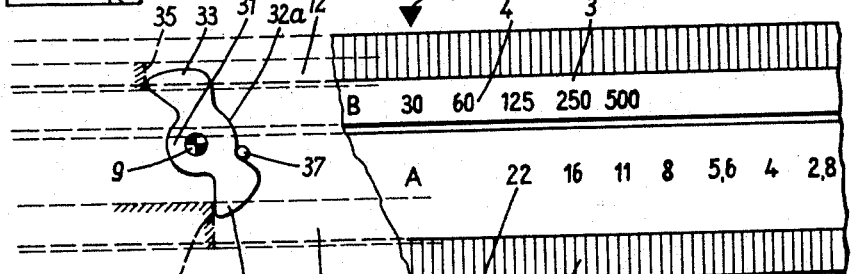
Figure 9:
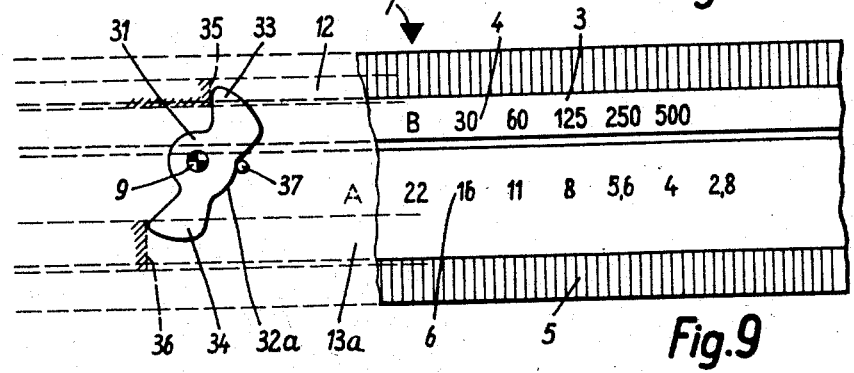
Figure 10:
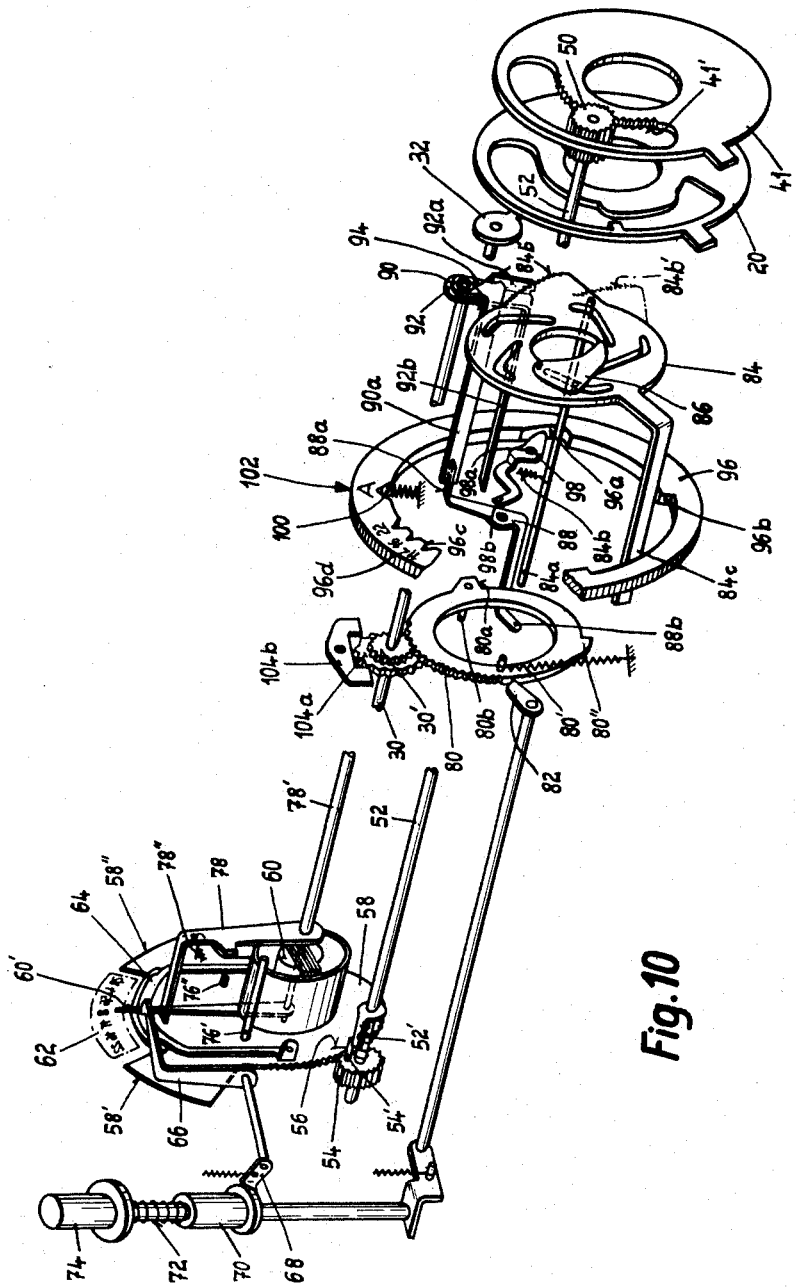
Figure 11:
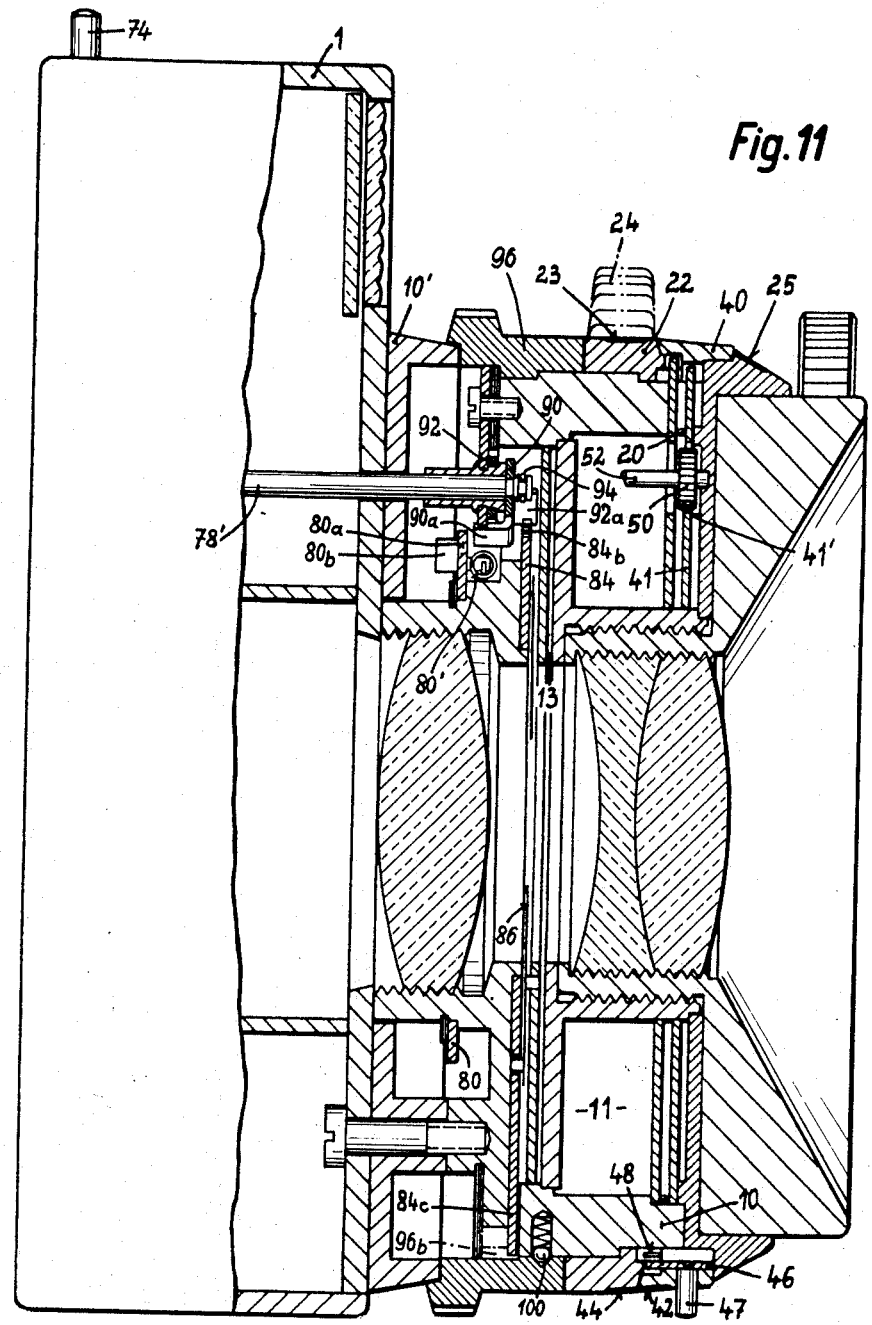

FIGS. 4, 5, and 6 are views similar to FIGS. 1, 2, and 3, respectively, showing a second embodiment of the invention, wherein the reference marks "B" and "A" are situated at opposite ends of their respective scales rather than at the same ends thereof;

FIGS. 7, 8, and 9 are views similar to FIGS. 1, 2, and 3, respectively, illustrating still another embodiment of the invention; and FIGS. 10 and 11 are reproductions of FIGS. 1 and 2 of the drawings of copending application Serial No. 842,145, to illustrate further details of a typical form of camera with which the present invention is useful.

For understanding the present invention, all that a person skilled in the art need know about the camera mechanism to which the invention is applied is that we are dealing with two adjusting rings or switching rings concentrically mounted for manual rotation, each ring being manually settable to any selected one of a series of rotary positions. One ring is a diaphragm aperture switching or controlling ring, and for this ring, one position is the "A" or automatic operation position, conditioning the internal mechanism for automatic setting of the diaphragm aperture in accordance with the operation of an exposure meter, while the other rotary positions of this ring respectively serve to set the diaphragm aperture to predetermined aperture sizes, as respectively indicated by a diaphragm aperture scale marked on this ring, preferably in the conventional f numbers. The other ring with which the present invention is concerned is a shutter speed switching or controlling ring, one position of which is the "B" or bulb operating position conditioning the shutter for making a manually or externally timed exposure, while the other rotary positions of this ring respectively serve to set the shutter for various internally timed speeds or durations of exposure, as respectively indicated by a shutter speed scale marked on this ring.

This much knowledge of the purpose or function of the two rings will, as above stated, enable one to understand the present invention, for the invention is not dependent upon the particular details of the way that the respective rings control or operate the internal mechanism of the shutter or diaphragm, such details being subject to wide variation and being unimportant for purposes of the present invention. However, those desiring a specific example of the internal mechanism and of the way that the two external rings control the internal mechanism may refer to the copending U.S. patent application of Kurt Gebele, Serial No. 842,145, filed September 24, 1959 (hereinafter sometimes referred to as the "prior application" or the "first application") and to Patent 3,044,377 which has been issued on this prior application. Another specific example of the two external rings, combined with a somewhat different form of internal mechanism, is disclosed in the copending U.S. patent application of Kurt Gebele, Serial No. 853,648, filed November 17, 1959 (hereafter sometimes referred to as the "second application"). This second application has now become Patent 2,969,004, granted January 24, 1961. The disclosures of both of said applications are hereby incorporated herein by reference.

Referring now to the first embodiment, as illustrated somewhat schematically in FIGS. 1-3, the camera itself is of conventional construction and mode of operation, and is equipped with a lens mount 1a at the forward end of a shutter housing 2 of conventional annular construction. Within the housing are the usual pivoted shutter blades shown schematically at 39 and the driving mechanism for operating them. Since the details of the shutter blades and of the mechanism for operating the shutter blades are subject to wide variation and are unimportant so far as the present invention is concerned, further particulars of the blades and the operating mechanism have not been shown, in order to avoid complicating the drawing. The shutter operating mechanism may, for example, take the form disclosed in United States Patents 2,900,885 and 2,900,886, of Gebele, issued August 25, 1959.

The two manually rotatable rings referred to earlier, and with which the present invention is concerned, are rotatable on the exterior of the housing 2 and consist of a shutter speed control ring 3 carrying a shutter speed scale 4, and a switching ring or diaphragm aperture control ring 5 carrying a diaphragm aperture scale 6. Both scales are read by reference to an index mark 7 on the lens mount 1a. As shown, the scale 4 is graduated in conventional units between 1/30 of a second and 1/500 of a second, these speeds being appropriate for use with an automatic aperture control type of shutter. At the larger time interval end of the scale is a mark "B" to be used when manually timing the shutter speed. The scale 4 thus has a range of speeds in any one of which the duration of exposure is automatically timed by the internal mechanism of the shutter, in the usual manner, and a "B" or "bulb" setting position in which the actions of opening and closing the shutter blades are controlled by two separate consecutive operations performed manually at arbitrarily selected intervals, as is customary with any conventional "B" exposure.

Although the interior construction operated by these rings 3 and 5, is as above indicated, not essential to an understanding of the present invention, it may be mentioned here that the shutter structure includes the conventional front lens tube 43 on which is rotatably mounted the conventional shutter speed control cam ring 45 having a radial arm which operatively connects it to the external ring 3 to turn therewith. There may also be another external setting ring 47a mounted on the periphery of the lens mount 1a and shutter housing 2 forwardly of the ring 3 for the purpose of, for instance, including a film speed adjustment. The ring 47a is coupled by a radial arm to an internal setting ring 49 located within the shutter and bearing rotatably about the lens tube 43 forwardly of the shutter speed control ring 45. The ring 49 may correspond to the ring 41 disclosed in said first application. There is a releasable coupling between the rings 3 and 47a which is not here shown but which may correspond to the coupling 46—48 disclosed in said first application. By means of this coupling, the angular position of the external setting ring 47a may be adjusted relative to the shutter speed setting ring 3, whereafter, upon reestablishing the coupling, the rings 3 and 47a rotate together. The effect of this adjustment is to adjust the angular position of the internal rings 49 and 45 to accomplish inclusion of the film speed in the setting of the shutter.

A plurality of diaphragm aperture leaves are indicated schematically in FIG. 1 at 51, each having a fixed pivotal connection with a stationary diaphragm ring 53. A diaphragm control ring 55 is rotatably mounted at the rear of the ring 53 and has a plurality of cam slots each engaging another movable pivot on a diaphragm leaf 51, so that rotation of the diaphragm control ring 55 in the usual manner serves to open and close the diaphragm aperture leaves 51. The diaphragm control ring 55 has a radial arm which is abuttable with a shoulder, not here shown, on the external diaphragm switching or control ring 5. The ring 55, the radial arm, and the switching member 5 may correspond to the elements 84, 84c, and 96 in said first application.

As above mentioned, and as more fully explained in said first application, the automatic diaphragm setting mechanism will set the diaphragm aperture satisfactorily to an appropriate aperture, if the external diaphragm control or switching ring 5 is set to its "A" or automatic position and if, also, the shutter speed control ring 3 is set to an internally timed shutter speed, such settings being illustrated in FIG. 2 of the present drawings. But if the speed ring 3 is moved to its "B" position for making a manually timed exposure, the switching ring 5 should not be allowed to remain in its "A" position, for the automatic diaphragm mechanism cannot foretell the duration of the manually timed exposure and thus cannot set the diaphragm accurately for an exposure value determined by the exposure meter, since for a given exposure value the duration of the exposure is a factor in determining the correct diaphragm aperture. The automatic diaphragm mechanism will still operate (if the ring 5 is left in its "A" position) but will not operate satisfactorily to set an appropriate aperture, for the reason just mentioned. Therefore, it is necessary, when making a "B" exposure, to set the diaphragm aperture by hand to an aperture selected by the photographer. The need for moving the switching ring 5 away from its "A" position to a manually set aperture position may be overlooked by the photographer, however, and the present invention provides simple and fool-proof mechanism to prevent such oversight.

To this end, a double-armed locking member 8 is mounted on the outside of the shutter housing 2 for limited rotation about a radially extending pivot pin 9, disposed in an enclosed cavity between the shutter housing 2 and the rings 3 and 5. The locking member 8 has an outwardly projecting flange 10a on one of its arms 11a which is adapted to project into a recess 12 formed in the interior of the shutter speed setting ring 3. The diaphragm switching ring 5 has a similar circumferentially extending recess 13a into which the other arm 14 of the locking member 8 is adapted to project. Coiled about the pivot pin 9 is a torsion spring 15 which bears at one end against a stud 16 on the arm 14, whereas its other end bears against a stud 17 projecting radially away from the shutter housing 2, the effect being to turn the locking member 8 in a clockwise direction. Fixed to the outside of the shutter housing 2 is a radially extending intercepting pin 18, while another radial intercepting pin 19 is provided on the switching ring 5. The end of the recess 12 in the speed setting member 3 forms an abutment 20a, and beyond this abutment the rear edge of the setting member 3 provides a sliding edge 21. The diaphragm switching ring 5 has a similar sliding edge 22a at one side of the recess 13a.

When it is desired to set the diaphragm aperture automatically, the switching ring 5 is rotated to the right as shown in FIG. 2 to position the mark "A" opposite the index mark 7. This action causes recess 13a and switching member 5 to move to the region of arm 14 of locking member 8, the arm 14 first sliding along the sliding edge 22a of ring 5 and then being urged by torsion spring 15 to snap into recess 13a so that flange 10a makes contact with the intercepting pin 18. In this position of locking member 8, adjustment of the speed setting ring 3 in the direction of slower shutter speeds is limited by arm 11a striking the abutment 20a at the end of recess 12 when the ring 3 reaches the slowest internally timed speed and before mark "B" reaches index 7. Thus, with the switching ring 5 in its automatic position, the locking member 8 prevents the speed setting ring 3 from moving into its position for manually timed speeds. However, there is freedom to select any desired one of the automatically or internally timed shutter speeds on the scale 4.

When it is desired to select manually a particular diaphragm aperture, the switching ring 5 is rotated out of its automatic position to deactivate the automatic aperture control mechanism. During this adjustment (clockwise when viewed from in front of the camera, or to the left when viewed from behind as in FIGS. 1–3), sliding edge 22a on ring 5 engages the angled end of arm 14 and swings the locking member 8 in a counterclockwise direction against the force of the spring 15, thereby to retract arm 11a out of the path of abutment 20a. The shutter speed setting ring 3 may now be rotated until mark "B" is in alinement with index 7, for the timing of a selected manually timed speed. The appropriate diaphragm aperture for the selected manually timed speed, of course, is set on the switching ring 5, so that a correct exposure may be made. The counterclockwise deflection of locking member 8 has caused arm 11a to move into the path of stop pin 19. It is retained in this depressed position by sliding edge 21 on the speed setting ring 3, to thus limit adjustment of switching ring 5 clockwise to the right to permit all the values on scale 6 to be selected with the exception of mark "A." Arm 11a cannot reenter recess 12 until the speed setting member 3 has been rotated to the left and mark "B" has been moved out of register with index 7. Only now may the switching ring 5 again be rotated to the right. The arm 11a is now free to reenter recess 13a in switching ring 5 before the arm 11a makes contact with the stop pin 19, being urged by torsion spring 15 out of the path of stop pin 19.

By the foregoing description, it will be understood that it is impossible to move both marks "B" and "A" simultaneously into alinement with the index mark 7. Consequently, when the switching ring 5 is in its automatic position, it is necessary to select an automatically internally timed speed on the scale 4. Conversely, with the speed setting ring 3 in its "B" position for manually timed speeds, it is necessary to select one of the manually set diaphragm apertures on the scale 6.

In the embodiment of FIGS. 1, 2 and 3, the diaphragm aperture scale is arranged as to increasing aperture reading from left to right, while the shutter speed scale 4 is arranged to indicate faster shutter speeds reading to the right. In both scales, the marks "B" and "A" are at the corresponding left ends of the scales. In the second embodiment, shown in FIGS. 4, 5, and 6, the diaphragm aperture scale is arranged as before with the mark "A" at the left end of the scale, whereas now the shutter speed scale 4 indicates increasing slower shutter speeds reading to the right, with the mark "B" at the right end of the scale. Much of the structure of FIG. 4 is identical with that of FIG. 1, corresponding elements being indicated by the same reference numerals, without the need for further description. The scales 4 and 6 in this modification are covered by a stationary masking ring 23a mounted about the periphery of the shutter housing 2 by a mounting portion extending between the rings 3 and 5. The masking ring 23a carries an index mark 24, and opposite the index mark 24a at one side is a window 25a through which one of the values on shutter speed scale 4 is visible, and there is another window 26 at the other side of the mark 24a through which one of the values on the diaphragm aperture scale 6 is visible.

Rigidly fixed by rivet 27 to speed setting member 3 is a locking member 28 in the form of an axially extending bar whose rear end projects into a recess 29 in diaphragm switching ring 5. The locking member 28 is secured to the ring 3 to the left of the shutter speed scale 4, and cooperates with an abutment 30a formed by one end of the recess 29 in the ring 5.

With the diaphragm switching ring 5 set for automatic operation as shown in FIG. 5, the entire range of automatically timed speeds on the scale 4 is selectable. However, when scale 4 is set to the "B" mark for manually timed speeds, as shown in FIG. 6, locking member 28 is shifted during the adjustment to strike abutment 30a on switching ring 5 and displace the latter in a leftward direction so that mark "A" representing the automatic aperture control setting is replaced by the first adjacent manually set diaphragm aperture value on the scale 6, which in this example is the aperture f:22 as here shown. Of course any other aperture may be set by further manual rotation of the ring 5, if desired.

Conversely, when the "B" setting for manually timed speeds is made on the scale 4 as illustrated in FIG. 6, if it is now desired to move the switching ring 5 from any manually set aperture to its automatic or "A" position, abutment 30a strikes locking member 28 when rotation of the switching ring 5 is continued beyond the last manually set diaphragm aperture on the scale 6. Mark "B" will therefore be displaced from alinement with the index 24a, and the adjacent automatically timed speed indication takes its place. Thus, the shutter speed 1/30 of a second, the slowest of the automatically timed speeds at the right end of the scale 4, is set opposite the index 24a. Of course any other internally timed speed may then be manually set, if desired. In this embodiment, it is consequently impossible to set both the "B" mark and "A" mark on the rings 3 and 5 at the same time opposite the index 24a.

The same effect may be achieved in a third embodiment of the invention illustrated in FIGS. 7, 8, and 9. In this embodiment, the shutter speed scale 4 and the diaphragm aperture scale 6 have the same arrangement as in FIGS. 2 and 3, with the marks "B" and "A" at the left ends of their respective scales. Much of the structure in FIGS. 7–9 is identical to that in FIGS. 1–3, corresponding elements being indicated by the same reference numerals without further description.

A locking member in the form of a double-armed lever 31 is pivotally mounted on the radial pin 9 in the shutter housing 2. The lever 31 has an arcuate cam edge 32a and projections 33 and 34 at either side thereof, with a dwell between each end of the cam edge 32a and its respective projection caused by the opposite curvatures. Shutter speed setting member 3 has a circumferentially extending recess 12 with an abutment 35 at its left end, while the diaphragm ring 5 has a circumferentially extending recess 13a with an abutment 36 at its left end. A radial stop pin 37 is fixed in the shutter housing 2 in a position such that the cam edge 32a slides past it, the stop pin serving to limit the extent to which the lever 31 may rotate.

With the diaphragm switching ring 5 positioned for automatic control as shown in FIG. 8 with the mark "A" opposite the index 7, rotation of the shutter speed setting member 3 in the attempt to bring the mark "B" into alinement with index 7 causes the abutment 35 to strike projection 33 of the double-armed lever 31 and rotate projection 34 against abutment 36, displacing diaphragm switching ring 5 sufficiently to replace the mark for the selection of automatic aperture control by the adjacent manually set diaphragm aperture value on scale 6, namely aperture f:22. Cam edge 32a slides past the stop pin 37 until locked in one of its dwells, to prevent further rotation of the double-armed lever 31 into a position in which the projections 33 and 34 move out of engagement with abutments 35 and 36. Conversely, referring to FIG. 9, if the attempt is made to set the diaphragm switching ring 5 to automatic control after having set the speed setting ring 3 to the "B" position for manually timed speeds, then the above described operation proceeds in the opposite direction, and the rotation of the ring 5 to the "A" position will swing the lever 31 to shift the speed ring 3 out of the "B" position to the next adjacent one of the internally timed exposure positions.

In each of the embodiments of the invention, it is seen that it is impossible to set the speed setting ring to its "B" position for manually timed speeds, and at the same time to select the automatic control position of the diaphragm switching ring 5 set to the mark "A," and vice versa. The respective locking member in each of the embodiments has a relatively simple structure and operation, and may be added to the existing structure as described in the prior application 842,145, with only a few modifications and changes.

It is believed that the present invention can be readily understood from FIGS. 1–9 of the present drawings together with the foregoing description, and without requiring any knowledge of the detailed internal construction of the mechanism, such as disclosed in said first application, Serial No. 842,145. However, for the benefit of those who may wish a more detailed knowledge of a typical form of automatic diaphragm setting mechanism, FIGS. 1 and 2 of said first application, Serial No. 842,145, are reproduced here as FIGS. 10 and 11 of the drawings of the present application, and the following condensed description of the mechanism shown in said FIGS. 10 and 11 is submitted.

Referring first to FIG. 11, there is a photographic camera of any suitable known type having a main body or housing 1 bearing on its front side a mounting ring 10' which encircles the optical axis. On this mounting ring there is an objective shutter unit whose housing is indicated in general at 10. The housing contains the usual shutter speed control cam 20, rotatable about the optical axis and operatively coupled to the external speed setting ring 22 having operative knobs or finger grips 24. This ring 22 corresponds to the speed setting ring 3 of FIGS. 1–9 of the present application.

An exposure time scale 23 on the ring 22 cooperates with a stationary index mark 25 on a fixed ring near the front of the shutter unit, these parts corresponding, for example, to the time scale 4 and the index mark 7 or 24a shown in FIGS. 1–9.

In the usual annular space 11 within the shutter housing is the usual shutter operating or driving mechanism, and the usual shutter blades are located within the annular space 13. As customary, the shutter is cocked or tensioned by a shaft 30 which lies parallel to the optical axis and which is operatively connected to the film winding or transport mechanism in the camera body, to tension the shutter automatically when the film is advanced. A tensioning disk 32 carried by the shaft 30 serves to tension or cock the master member of the shutter mechanism, and the shaft also carries a pinion 30' which moves the control ring 80 to its tensioned position.

A setting ring 40 rotatably mounted on the housing carries a film speed scale 42 cooperating with an index mark 44 on the speed setting ring 22. A leaf spring 46 secured to the ring 40 has an end engaging in any desired one of a series of coupling notches 48 on the speed setting ring 22, to connect the two rings for conjoint rotation. The external setting ring 40 is coupled to an internal setting ring 41 having teeth 41' meshing with a pinion 50 fixed to a shaft 52 extending rearwardly into the camera body and carrying there a driving disk 52' which drives a pin 54' on a pinion 54 meshing with teeth on a supporting plate 58 which serves as a mounting for the measuring mechanism 60 (e.g., a moving coil galvanometer) of the photoelectric exposure meter.

Mounted on the plate 58 is a stirrup-like pivoted clamping member 64 which, when actuated by an arm 66, presses against the forward face of the pointer 60' and clamps it fast against a stationary plate 58 located to the rear of the pointer. Downward movement of the camera release plunger 74 compresses a spring 72 which pushes downwardly on a sliding sleeve 70 and, through suitable connections, causes the swinging arm 66 to clamp the exposure meter pointer 60' in any stationary position in which it may be at the moment.

A spring 80' tends to turn the ring 80 in a counterclockwise direction toward its rest or run-down position. A locking pawl 82 operatively connected to the release plunger 74 drops behind a latching notch 80'' on the ring 80 and holds the ring in its cocked or tensioned position until the release plunger is depressed.

When the ring 80 is turned in a clockwise direction to tension it, a projection 80a thereon engages an axially extending pin 84a on the diaphragm control ring 84 which, through the usual control slots, actuates the diaphragm leaves 86 which collectively make up an iris diaphragm. A spring 84b tends to turn the diaphragm control ring in a counterclockwise direction to the position of minimum aperture.

An axially extending shaft 78' carries a feeler 78 which may swing until it engages the meter pointer 60' in the clamped position thereof, so that the position of the meter pointer determines the angular position of the shaft 78'. A lever 90 is fixed to the shaft 78' near its forward end. Alongside it is a locking pawl 92 coupled by a spring 94 to the lever 90 to move therewith. A lug 92a on the member 90 constitutes a locking tooth adapted, depending on its position, to engage a selected one of the step-shaped notches or abutments 84b' on the periphery of the control ring 84.

In an externally accessible position on the housing, there is a rotatable switching ring 96 which corresponds to the switching ring 5 of FIGS. 1–9 of the present application. This ring 96 has a cam surface 96a cooperating with one arm of a lever 98 pivoted on a pivot 98a. The ring also carries, externally, a diaphragm aperture scale 96d and the designation "A" standing for "automatic." When the designation "A" is opposite the index mark or reference point 102 on a fixed part, the switching ring 96 is set for automatic operation and the lever 98 is ineffective to alter the position of the locking tooth 92a. When, however, the ring 96 is turned away from the "A" setting position, to bring one of the diaphragm aperture values opposite the reference point 102, then the cam 96a shifts the lever 98 to swing the locking tooth 92a radially outwardly away from the optical axis so that it does not interfere with any one of the steps 84b' and thus allows complete rotation of the internal diaphragm control ring 84. At the same time, a shoulder 96b on the ring 96 will be moved to a position to engage an arm 84c on the ring 84 during the subsequent running-down movement of the ring, and hold the ring 84 (against the tension of its spring 84b) at any desired diaphragm aperture size indicated by the scale 96d.

When the film transport mechanism on the camera body is operated to advance the film and simultaneously to tension the shutter and diaphragm mechanism, the clockwise rotation of the ring 80 will carry with it, by engagement with the pin 84a, the internal diaphragm control ring 84, opening the diaphragm to maximum aperture. The manual setting of the shutter speed ring 22 to the desired shutter speed will turn the ring 41 with it, thereby turning the pinion 50 and the shaft 52 and the pinion 54 so as to swing the meter mounting plate 58 to a position depending upon the shutter speed (and also upon the film speed).

Then when the release plunger 74 is depressed to make the exposure, this clamps the pointer 60' fast in a stationary position, and also releases the latch 82 of the ring 80, so that the latter runs down in a counterclockwise direction under the influence of its spring 80'. Through the lever 88 and associated parts, this releases the displacing force on the locking tooth 92a and its shaft 78', so that the shaft swings under the influence of its spring 78'' until the feeler 78 engages the clamped pointer 60'. This positions the locking tooth 92a in the position to engage the proper one of the steps or abutments 84b' to stop the running down movement of the diaphragm control ring 84 (under the influence of its spring 84b) at the appropriate diaphragm aperture position, depending upon the previously set shutter speed control parts and the position of the pointer 60' of the exposure meter.

If it is desired to set the diaphragm aperture manually rather than automatically, the switching ring 96 is moved in a clockwise direction from the automatic position "A." As already explained, the cam 96a serves to move the locking tooth 92a radially outwardly away from the optical axis, so that it will not engage any of the stepped abutments 84b'. At the same time, the shoulder 96b on the ring 96 will now serve, rather than the locking tooth 92a, as the stopping member for stopping the running down movement of the ring 84 from maximum aperture position toward minimum aperture position, when the exposure is made.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic shutter and diaphragm assembly comprising a shutter speed setting member manually movable to a position for making a manually timed exposure and to a plurality of positions for making an internally timed exposure, a diaphragm aperture control member manually movable to a position for automatic control of a diaphragm aperture and to a plurality of positions for manual control of said diaphragm aperture, and a control element moved by movement of one of said members to its first-mentioned position for blocking movement of the other of said members to its first-mentioned position.

2. A construction as defined in claim 1, in which said control element is a pivoted lever shifted by movement of one of said members to its first-mentioned position into a position blocking movement of the other of said members to its first-mentioned position.

3. A construction as defined in claim 1, in which said control element is rigidly secured to one of said members and cooperates with an abutment on the other of said members.

4. A photographic shutter and diaphragm construction comprising a shutter speed setting ring rotatable to a "B" position for making a bulb exposure and to a plurality of other positions for making internally timed exposures of various durations, a diaphragm aperture control ring rotatable to an "A" position for automatic control of a diaphragm aperture and to a plurality of other positions for setting a diaphragm to a pre-selected aperture, and control means for moving one of said rings from its first-mentioned position to the next adjacent one of its other positions by the act of moving the other of said rings to its first-mentioned position.

5. A construction as defined in claim 4, in which said control means comprises an abutment on one of said rings and an arm rigidly mounted on the other of said rings in position to engage wtih said abutment.

6. A construction as defined in claim 4, in which said control means comprises two abutments, one on each of said rings, and a pivoted lever having one portion to be engaged and moved by one of said abutments and another portion to engage and move the other of said abutments.

7. A photographic shutter and diaphragm assembly of the type comprising a shutter speed setting member manually movable to a first position for making a manually timed exposure and to a plurality of other positions for making internally timed exposures of different durations, and a diaphragm aperture control member manually movable to a first position for automatic control of a diaphragm aperture and to a plurality of other positions for manual control of diaphragm apertures of different sizes, characterized by movable control means moved at least in part in response to movement of said aperture control member from one of its said other positions to its said first position for blocking movement of said speed setting member from one of its said other positions to its said first position.

8. A photographic shutter and diaphragm assembly of the type comprising a shutter speed setting member manually movable to a first position for making a manually timed exposure and to a plurality of other positions for making internally timed exposures of different durations, and a diaphragm aperture control member manually movable to a first position for automatic control of a diaphragm aperture and to a plurality of other positions for manual control of diaphragm apertures of different sizes, characterized by movable control means including an abutment surface on said aperture control member and a movable member responsive to the position of said speed setting member and engageable with said abutment surface, for shifting either of said members from its first position to one of its other positions, by the act of moving the other of said members from one of its other positions to its first position.

9. A photographic shutter and diaphragm assembly of the type comprising a shutter speed setting member manually movable to a first position for making a manually timed exposure and to a plurality of other positions for making internally timed exposures of different durations, and a diaphragm aperture control member manually movable to a first position for automatic control of a diaphragm aperture and to a plurality of other positions for manual control of diaphragm apertures of different sizes, characterized by movable control means moved at least in part in response to movement of one of said members, for (a) blocking movement of said speed setting member to its said first position so long as said diaphragm control member remains in its said first position, and for (b) blocking movement of said diaphragm control member to its said first position so long as said speed setting member remains in its said first position.

References Cited in the file of this patent

UNITED STATES PATENTS

| | | |
|---|---|---|
| 1,584,408 | Topliff et al. | May 11, 1926 |
| 2,868,095 | Gebele | Jan. 13, 1959 |
| 2,891,457 | Schwann | June 23, 1959 |
| 2,974,578 | Wittel | Mar. 14, 1961 |
| 2,985,082 | Starp | May 23, 1961 |